Figure 1:
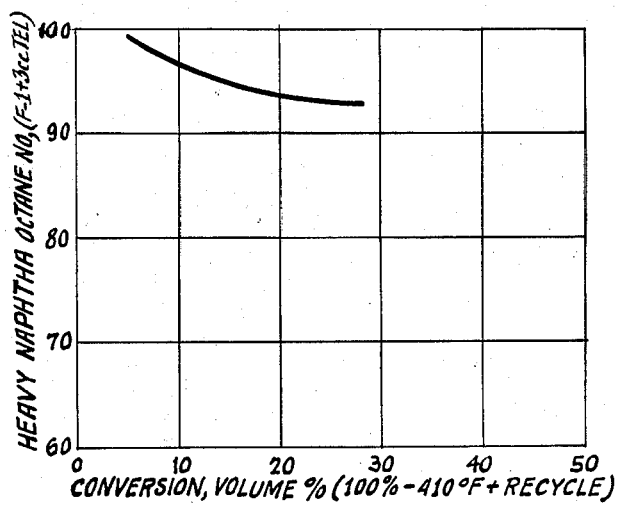

July 19, 1960   F. G. CIAPETTA ET AL   2,945,805
PRODUCTION OF HIGH QUALITY GASOLINE AND DIESEL FUEL
BY HYDROCRACKING A REFRACTORY CYCLE OIL
Filed Feb. 14, 1957

INVENTORS
Frank G. Ciapetta
Harry L. Coonradt
William E. Garwood
BY
Hastings S. Trigg
ATTORNEY

United States Patent Office 2,945,805
Patented July 19, 1960

2,945,805

PRODUCTION OF HIGH QUALITY GASOLINE AND DIESEL FUEL BY HYDROCRACKING A REFRACTORY CYCLE OIL

Frank G. Ciapetta, Silver Spring, Md., and Harry L. Coonradt, Woodbury, and William E. Garwood, Haddonfield, N.J., assignors to Socony Mobil Oil Company, Inc., a corporation of New York Filed Feb. 14, 1957, Ser. No. 640,204

2 Claims. (Cl. 208—110)

This invention relates to the art of cracking. It is more particularly concerned with a process for converting refractory charge stocks into high quality gasoline and Diesel fuel.

As is well known to those skilled in the art, refractory cycle stocks obtained from catalytic cracking have a relatively limited use, as such. To some extent they have been recycled in cracking processes but cracking is difficult because of the refractory nature of the stocks. Such materials have also been used to produce diesel fuel and domestic fuel oils. Such use is disadvantageous, however, because the cycle stocks are of relatively poor quality and must be further processed before they can be used.

In hydrocarcking operations such as are described in copending application Serial Number 351,151, filed April 27, 1953, now abandoned and in Serial Number 418,166, filed March 23, 1954, a continuation-in-part thereof, now abandoned, there is usually obtained a fuel oil fraction that is of relatively high quality. The gasoline that is produced in such an operation, however, has a relatively low octane number. Accordingly, it must be subjected to a reforming operation in order to raise its octane level to that demanded in modern motor fuels. It will be readily appreciated, and it would be highly desirable, to obtain high octane gasoline and fuel oil having a high cetane index in one operation, and to find a means for converting refractory cycle stocks into useful products.

It has now been found that refractory cycle stocks can be converted into useful products by a process that is relatively simple and commercially feasible. It has been discovered that a refractory cycle stock can be converted into gasolines having an octane number of at least 95 (F–1+3 cc. TEL) and into a diesel fuel having a cetane index of at least 35 and excellent storage stability by contacting it with a platinum or palladium series metal containing catalyst, in the presence of hydrogen under carefully controlled conditions.

Accordingly, it is an object of this invention to provide a process for converting refractory stocks into useful materials. Another object is to provide a process for producing high octane gasoline and high quality diesel fuel in the same operation. A specific object is to provide a process for converting refractory charge stocks in one operation, into gasoline having an octane rating of at least 95 (F–1+3 cc. TEL) and into a diesel fuel having a cetane index of at least 35 and improved storage stability. A more specific object is to provide for a process for converting refractory cycle stocks into high octane gasoline and high quality Diesel fuel by contacting it, in the presence of hydrogen, with a platinum or palladium series metal containing catalyst under carefully controlled conditions.

Figure 2:
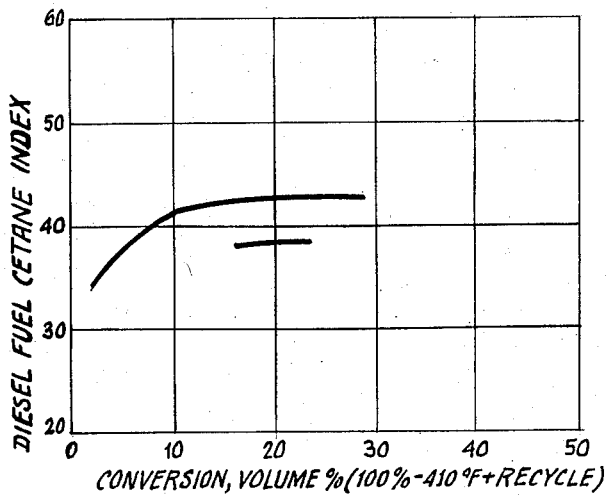
Figure 3:
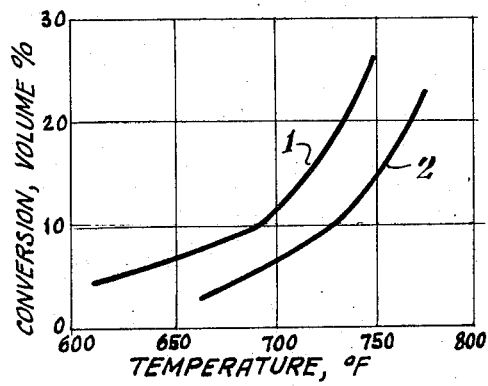

Other objects and advantages of the present invention will become apparent to those skilled in the art from the following detailed description considered in conjunction with the drawings wherein:

Figure 1 presents the graphic relationship between the leaded octane number of the gasoline and the volume percent conversion into products boiling at temperatures lower than about 410° F. obtained by contacting a typical refractory cycle stock with a platinum-containing catalyst in accordance with the process of this invention;

Fig. 2 presents the graphic relationship between the cetane index of the diesel fuel and the volume percent conversion into products boiling at temperatures lower than about 410° F. obtained by contacting a typical refractory cycle stock with a platinum-containing catalyst in accordance with the process of this invention; and Fig. 3 presents the graphic relationship between the volume percent conversion into products boiling at temperatures lower than about 410° F. and the temperature obtained by contacting a typical gas oil with a platinum-containing catalyst at two different space velocities and in accordance with the process of this invention.

In general, the present invention provides a process for converting refractory charge stocks into gasoline having a leaded octane rating of at least 95 and into diesel fuel having a cetane index of at least 35 and improved storage stability that comprises contacting a refractory charge stock that has an initial boiling point falling within the range varying between about 300° F. and about 500° F. and an end boiling point falling within the range varying between about 600° F. and about 900° F., and which contains at least one percent sulfur by weight, with a catalyst that includes between about 0.05 percent and about 20 percent, by weight of the catalyst, of at least one metal selected from the group consisting of metals having atomic number of 44 to 46, inclusive and 76 to 78, inclusive, deposited upon a synthetic composite of the solid oxides of at least two elements of groups IIA, IIIB and IV of the periodic arrangement of the elements, said composite having an activity index of at least 25, in the presence of hydrogen in amounts expressed as the molar ratio of hydrogen to hydrocarbon charge varying between about 10 and about 80, at a liquid hourly space velocity varying between about 0.25 and about 5 under a hydrogen pressure varying between about 500 p.s.i.g. and about 3000 p.s.i.g., and at a temperature varying between about 600° F. and about 800° F.; and correlating said temperature with said liquid hourly space velocity to maintain the amount of conversion into products boiling at temperatures below about 410° F. between about 5 volume percent and about 25 volume percent.

Throughout the specification and claims the term "conversion" is intended to be a generic term for the amount of products boiling at temperatures lower than about 410° F. (100-recycle), of gasoline, or of diesel fuel obtained in the process. It is expressed in terms of the volume percent of the initial charge which is transformed in the process. The amount of product boiling at temperatures lower than about 410° F. is obtained by subtracting the volume percent of cycle stock (diesel fuel) from 100 percent, i.e., from the initial volume of the charge. The expression, "100-recycle" is an abbreviation for the subtraction. As the cycle stock obtained in the process is an excellent diesel fuel, conversion into diesel fuel is the volume percent of product which boils at temperatures higher than about 410° F. "Dry gas" refers to the methane, ethane, propane and ethylene and propylene produced in the cracking process expressed in terms of weight percent of the initial charge. Light naphtha is the product that boils between about 125° F. and about 170° F. The "heavy naphtha" is the product that boils between about 170° F. and about 410° F. The "cetane index" of the diesel fuel is a measure of its burning qualities that is determined by the procedure set forth in the appendix to A.S.T.M. Test D975–53T. The cracking activity of a carrier is expressed in terms of the percent by volume of a standard hydrocarbon charge which is cracked under specific operating conditions in the "Cat. A" test. This test is described by Alexander and Shimp in National Petroleum News, 36, page R-537 (August 2, 1944). The unit for rating the cracking activity of the material is called the "activity index" (A.I.).

The catalysts utilizable herein are those described in copending application Serial Number 351,151, filed on April 27, 1953; and in the continuation-in-part thereof, Serial Number 418,166, filed on March 23, 1954. Briefly, these catalysts comprise between about 0.05 percent, by weight, and about 20 percent, by weight of the final catalyst, preferably between about 0.1 percent and about 5 percent, by weight, of at least one metal of the platinum and palladium series, i.e., those having atomic numbers of 44–46, inclusive, 76–78, inclusive, supported upon synthetic composites of two or more refractory oxides. The carrier is a synthetic composite of two or more refractory oxides of the metals of groups IIA, IIIB, IVA and B of the periodic arrangement of elements [J. Chem. Ed., 16, 409 (1937)]. These synthetic composites of refractory oxides must have an activity index of at least about 25. They can also contain halogens and other materials which are known in the art as promoters for cracking catalysts, or small amounts of alkali metals that are added for the purpose of controlling the activity index of the carrier. Non-limiting examples of the composites contemplated herein include silica-alumina, silica-zirconia, silica-alumina-zirconia, alumina-boria, silica-alumina-fluorine, and the like. The preferred support is a synthetic composite of silica and alumina containing between about 1%, by weight, and about 90%, by weight, of alumina. These synthetic composites of two or more refractory oxides can be made by any of the usual methods known to those skilled in the art of catalyst manufacture. Examples of methods of preparing them are set forth in copending applications Serial Numbers 351,151 and 418,166, supra.

The following example illustrates a method of preparing a platinum-containing catalyst utilizable in the process of this invention:

EXAMPLE 1

A synthetic silica-alumina carrier or support containing 10 percent by weight alumina was prepared by mixing an aqueous solution of sodium silicate (containing 158 g. per liter of silica) with an equal amount of an aqueous acid solution of aluminum sulfate containing 39.4 g. $Al_2(SO_4)_3$ and 28.6 g. concentrated $H_2SO_4$ per liter. This mixture of solutions was dropped through a column of oil, wherein gelation of the hydrogel was effected in bead form. The bead hydrogel was soaked in hot water (about 120° F.) for about 3 hours. The sodium in the hydrogel was then removed by exchanging the gel with an aqueous solution of aluminum sulfate [1.5% $Al_2(SO_4)_3$ by weight] containing a small amount (0.2 percent by weight) of ammonium sulfate. The thus-exchanged hydrogel bead was water-washed. Then, it superheated steam (about 280–340° F.) for about 3 hours and, finally, calcined at 1300° F. under a low partial pressure of steam for about 10 hours.

A portion of the calcined carrier was then sprayed with aqueous solution of chloroplatinic acid, of concentration sufficient to produce the desired amount of metal in the finished catalyst. The thus-impregnated carrier was then aged in a covered vessel at 230° F. for 24 hours. The catalyst was heated to 450° F. in a nitrogen atmosphere and then treated with hydrogen for two hours at 450° F. Prior to use, it was activated in hydrogen for two hours at about 900° F. The catalyst thus-prepared contained 0.53% platinum, by weight of the catalyst, and the silica-alumina carrier had an activity index of 46.

The charge stocks used in the process of this invention are the so-called refractory charge stocks, i.e., hydrocarbon fraction that are normally resistant to conventional cracking. The generally preferred charge material is the refractory cycle stock that is obtained from the conventional cracking of gas oils, such as by cracking in the presence of silica-alumina or clay catalysts. Also utilizable, in some circumstances, are the coker gas oils and thermal gas oils. A straight run gas oil, however, is not utilizable herein. The charge material must have an initial boiling point falling within the range varying betweeen about 300° F. and 500° F. and an end boiling point falling between the range varying between about 600° F. and about 900° F. A preferred refractory cycle stock obtained from conventional cracking will boil between the range varying between about 400° F. and about 700° F. It is essential to the process of this invention that the charge stock must contain at least one percent sulfur by weight, and preferably more.

The process of this invention must be carried out at a liquid hourly space velocity varying between about 0.25 and about 5, preferably between about 0.5 and about 3. The amount of hydrogen charged to the process should be sufficient to obtain refining of the diesel fuel. In order to avoid lowering of the octane rating of the naphtha produced, however, the amount of hydrogen should not be too great. Accordingly, the amount of hydrogen charged, expressed as the mole ratio of hydrogen to hydrocarbon charge, should be between about 10 and about 40, preferably between about 10 and about 30. The temperature of the process must be correlated with the liquid hourly space velocity, in order to maintain the amount of conversion into products boiling below about 410° F. between about 5 volume percent and about 25 volume percent. This will become apparent from the following example.

EAMPLE 2

The charge material used in the runs described in this example was a refractory cycle stock obtained by cracking a refinery gas oil in a thermofor catalytic cracking unit in the presence of a silica-alumina catalyst. This cycle stock had the following properties:

A.P.I. gravity _____ 25.0
ASTM distillation:
    I.B.P. _____ ° F__ 419
    50% _____ ° F__ 538
    E.B.P. _____ ° F__ 634
    Cetane index _____ 31.8
    Sulfur, weight percent _____ 1.55

In a series of runs, this cycle stock was contacted with the catalyst described in Example 1, in the presence of hydrogen. Each run was carried out at a pressure of about 1000 p.s.i.g., at a liquid hourly space velocity of 1 and using a hydrogen to hydrocarbon molar ratio of 20. Each run was carried out at a different temperature. Pertinent data are set forth in Table I.

Another portion of the cycle stock was contacted with the catalyst described in Example 1 at a temperature of 765° F. and using a liquid hourly space velocity of 2. The pressure and the hydrogen to hydrocarbon molar ratio were the same as described in the preceding paragraph. Pertinent data for this run are set forth in Table I.

*Table 1*

| Run | 1 | 2 | 3 | 4 |
|---|---|---|---|---|
| LHSV | 1 | 1 | 1 | 2 |
| Average Cat. Temp., ° F | 673 | 712 | 745 | 765 |
| Conversion (100–410° F.+Recycle) | 8.6 | 12.1 | 24.6 | 19.5 |
| $C_5$–170° F. Naph., Vol. Percent | 0.3 | 1.0 | 1.8 | 1.3 |
| Heavy Naphtha, 170–410° F.: | | | | |
|   Volume, Percent | 10.6 | 14.4 | 25.2 | 18.5 |
|   Gravity, ° API | 36.1 | 38.6 | 41.4 | 40.8 |
|   Octant No. (F–1+3 cc. TEL) | 97.4 | 95.5 | 93.0 | 94.2 |
| Cycle Stock, 410° F.+: | | | | |
|   Volume, Percent | 91.4 | 87.9 | 75.4 | 80.5 |
|   Gravity, ° API | 30.4 | 31.9 | 32.9 | 30.0 |
|   Aniline No., ° F | 123.0 | 125.7 | 123.6 | 117.9 |
|   Cetane Index | 40.2 | 42.0 | 42.3 | 38.9 |

Figs. 1, 2 and 3 are based upon the data in Table I. Fig. 1 presents the graphic relationship between the leaded octane number of the gasoline and the volume percent conversion into products boiling at temperatures lower than about 410° F. that is obtained by contacting the cycle stock with the platinum catalyst. It will be noted that at conversion levels greater than about 15 volume percent, the octane number drops below 95, when using the particular charge stock of the example. At conversion temperatures below 15 volume percent, the octane number increases in inverse ratio to the amount of conversion. When other charge stocks are used, however, the maximum amount of conversion can be higher. Thus, in order to achieve one of the desiderata of the process of this invention, the conversion level, in general, must be no greater than 25 volume percent, depending upon the particular charge.

In order to insure concurrent production of a diesel fuel having a high cetane index of greater than 35 and preferably greater than 37, the amount of conversion in the process into gasoline must be at least about 5 volume percent. This will be apparent from Fig. 2 wherein is presented in graphic relationship between the cetane index of the diesel fuel and the volume percent conversion into products boiling at temperatures lower than about 410° F. that is obtained concurrently with the production of gasoline as shown in Fig. 1. It will be noted that as the conversion level increases, the cetane index rises to above 35 at a conversion level at about 3 volume percent and to above 37 at a conversion level of about 5 volume percent. Accordingly, in order to obtain simultaneous production of gasoline having a leaded octane number of at least 95 and of a diesel fuel having a cetane index greater than 37, the amount of conversion in the process must be maintained between about 5 volume percent and about 25 volume percent, and preferably between about 5 volume percent and about 15 volume percent.

In order to effect the desired amount of conversion, the process must be carried out with a strict correlation of the liquid hourly space velocity with the temperature. This correlation is illustrated by the curves in Fig. 3. Curve 1 presents the graphic relationship between the temperature and the amount of conversion into products boiling at temperatures lower than about 410° F. when the refractory cycle stock is contacted with the platinum-containing catalyst at a space velocity of 1. Curve 2 presents a similar relationship when the process is operated at a space velocity of 2. It will be noted that at the higher space velocity, a temperature of no greater than 750° F. can be used to maintain the amount of conversion below 15 volume percent. At the lower space velocity (curve 1), the highest temperature utilizable is about 720° F. On the other hand, in order to maintain at least 5 volume percent conversion, the temperature at the lower space velocity must be at least about 625° F. At other space velocities, the temperature-conversion relationships will vary in the order shown in Fig. 3, with an increase or decrease in space velocity. In general, therefore, the range of temperature within which the temperature and space velocity must be correlated to achieve the process of this invention will vary between about 500° F. and about 800° F., and preferably between about 650° F. and about 800° F.

EXAMPLE 3

In order to show the storage stability of the products of this invention, the products of runs 1 through 4 of Example 2 were subjected to the following storage test:

A 500-milliliter sample of the fuel oil under test is placed in a convector oven maintained at 110° F. for a period of 12 weeks. Then the sample is filtered through a tared asbestos filter (Gooch crucible) to remove the insoluble matter. The weight of such matter, in milligrams, is reported as the amount of sediment.

Samples of the products of runs 1 through 4 were subjected to this test in comparison with a typical cracked distillate fuel oil. The pertinent data are set forth in Table II:

Table II

| | Cracked Distillate Fuel Oil | Run 1 | Run 2 | Run 3 | Run 4 |
|---|---|---|---|---|---|
| Color, Initial, N.P.A. | D-1 | L-3 | D-2½ | L-3 | L-4 |
| 12 Weeks, 10° F.: Color, N.P.A. | L-5 | D-2 | D-2½ | D-2½ | L-3½ |
| Sediment, Mg/l | 243 | 26 | 39 | 37 | 43 |

It will be apparent from the data in Table II that fuel oils produced by the process of the present inventions have excellent storage stability. Accordingly, these properties of good storage stability plus the high cetane index render these materials vastly superior to the fuel oils heretofore available.

Although the present invention has been described in conjunction with preferred embodiments, it is to be understood that modifications and variations may be resorted to, without departing from the spirit and scope thereof, as those skilled in the art will readily understand. Such variations and modifications are considered to be within the purview and scope of the appended claims.

We claim:

1. A process for hydrocracking refractory cycle stocks which have been produced in conventional catalytic cracking and which contain at least one percent, by weight, sulfur to produce directly a naphtha having a leaded (3 ml.) octane rating of at least 95 without reforming and a diesel fuel having a cetane index of at least 35, which comprises: contacting said refractory cycle stock from conventional catalytic cracking which has a sulfur content of at least one percent, by weight, an initial boiling point within the range about 300° F. to 500° F. and an end boiling point within the range about 600° F. to 900° F., with a catalyst which includes 0.05 percent to 20 percent, by weight, of the catalyst, of at least one metal selected from the group consisting of metals having atomic numbers of 44 to 46, inclusive, and 76 to 78, inclusive, deposited upon a synthetic composite of the solid oxides of at least two elements of groups IIA, IIIB and IV of the periodic arrangement of the elements, said composite having an activity index of at least 25, in the presence of hydrogen in amounts expressed as the molar ratio of hydrogen to hydrocarbon charge, within the range about 10 to about 40, at a liquid hourly space velocity within the range about 0.25 to about 5, under a hydrogen pressure within the range about 500 to about 3000 p.s.i.g. and at a temperature within the range about 600° F. to about 900° F., and correlating said temperature and space velocity to maintain the amount of conversion to products boiling below 410° F. within the range about 5 to 25 volume percent.

2. The process of claim 1 further limited to the metal used in said catalyst being platinum in an amount within the range 0.1 to 5 percent and said composite having an activity index of at least 28.

References Cited in the file of this patent

UNITED STATES PATENTS 2,763,623    Haensel            Sept. 18, 1956
2,799,626    Johnson et al.       July 16, 1957

UNITED STATES PATENT OFFICE

CERTIFICATE OF CORRECTION

Patent No. 2,945,805                      July 19, 1960

Frank G. Ciapetta et al.

It is hereby certified that error appears in the printed specification of the above numbered patent requiring correction and that the said Letters Patent should read as corrected below.

Column 3, line 56, after "Then, it" insert -- was dried in --; column 6, Table II, first column thereof, second line, for "12 Weeks, 10° F.:" read -- 12 Weeks, 110° F.: --.

Signed and sealed this 10th day of January 1961.

(SEAL)
Attest:

KARL H. AXLINE
Attesting Officer

ROBERT C. WATSON
Commissioner of Patents